(No Model.)
N. SHAW.
FRICTION CLUTCH.
No. 412,674.     Patented Oct. 8, 1889.
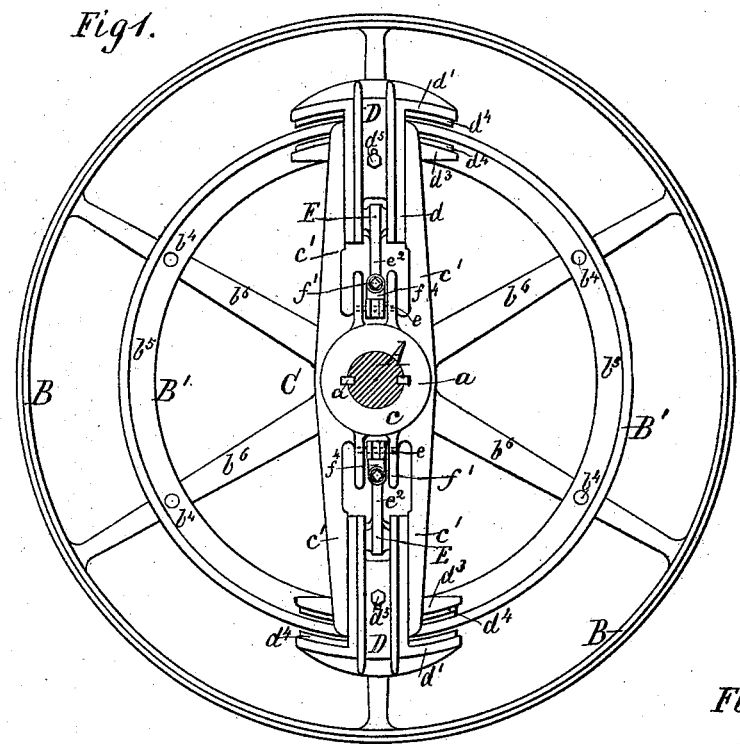
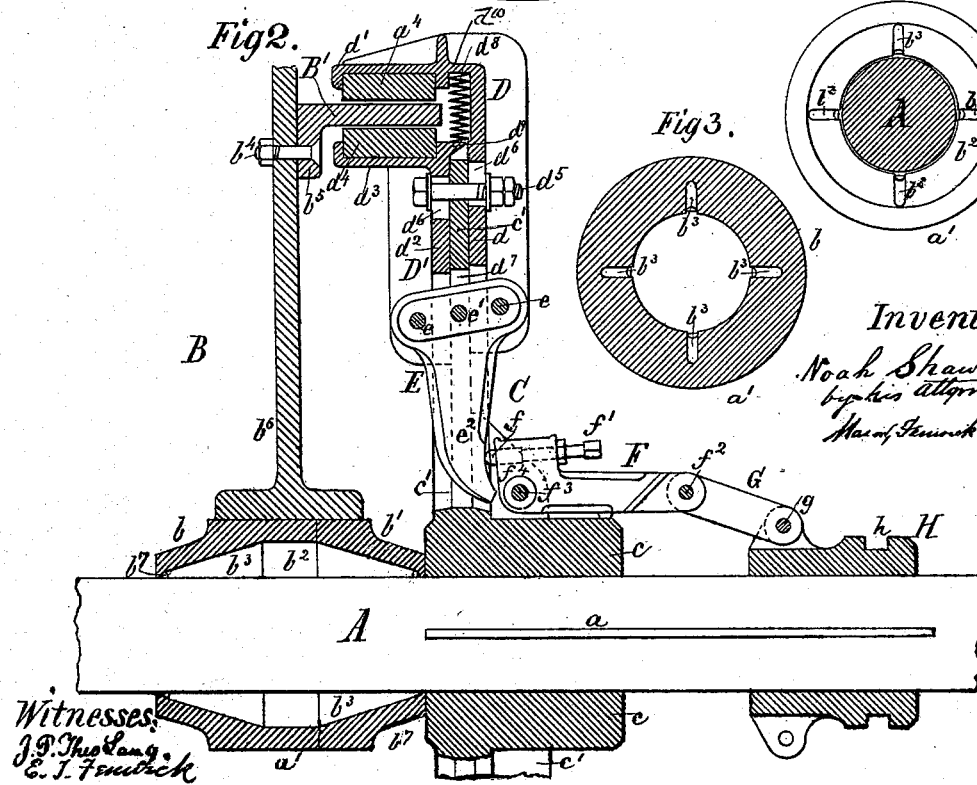

UNITED STATES PATENT OFFICE.

NOAH SHAW, OF EAU CLAIRE, WISCONSIN.

FRICTION-CLUTCH.

SPECIFICATION forming part of Letters Patent No. 412,674, dated October 8, 1889.

Application filed June 6, 1888. Serial No. 276,243. (No model.)

*To all whom it may concern:*

Be it known that I, NOAH SHAW, a citizen of the United States, residing at Eau Claire, in the county of Eau Claire and State of Wisconsin, have invented certain new and useful Improvements in Friction-Clutches; and I do hereby declare the following to be a full, clear, and exact description of the invention, such as will enable others skilled in the art to which it appertains to make and use the same.

My invention relates to friction-clutches, and it is an improvement on the clutch shown in the patent granted to H. W. Hill February 10, 1885, No. 312,122.

The object of my invention is to facilitate the adjustment of clutching-clamps.

In the accompanying drawings, Figure 1 is an end view of a pulley and friction-clutch, showing my improvement, the sliding collar and links being omitted. Fig. 2 is a central longitudinal section of the same through the operating-slide and upper portion of the clutch and an elevation of the clamping-levers. Figs. 3 and 4 are detail views.

The letter A in the drawings represents a shaft; B, a pulley; C, a clutch-frame; D D', two inversely and radially movable clutching members or clutching-clamps; E, clamp-lever; F G, toggle-links, and H slide.

The pulley B is preferably fastened to a self-lubricating hub $a'$, which is by preference made of two pieces $b$ $b'$, as shown, but may be in one piece. This hub is constructed with a lubricant-chamber $b^2$, inclined grooves $b^3$, and annular grooves $b^7$. The lubricant is placed in the chamber so as to extend up to the driving-shaft B and fill the lower series of the grooves $b^3$ and annular grooves $b^7$, and thus, when the pulley is idle and unclutched from the shaft, lubricate the shaft. By the annular grooves and capillary attraction the lubricant is prevented from escaping at the end of the hub. When the pulley is revolved, the body of lubricant is by centrifugal force caused to thin out and press against the inner periphery of said chamber, all the lubricant in the grooves $b^3$ $b^7$ flowing back into the chamber $b^2$ and uniting with that already therein. When the pulley is unclutched, the lubricant gradually settles in the lower part of the chamber $b^2$ and in the lower series of grooves, and that portion thereof which may have by the momentum of the pulley been carried around flows along said upper series of grooves into the annular grooves $b^7$, and is thus collected in said grooves and returned to the chamber $b^2$ by the lower series of the grooves $b^3$.

My pulley B is provided with a flanged cylindrical friction-clutch ring or rim B', which is, by means of bolts or rivets $b^4$ and its flange $b^5$, secured to the arms $b^6$ of the pulley B, or the rim and pulley may be cast in one piece.

The clutch-frame C may consist of a hub $c$, secured to the shaft A by means of a key $a$ or otherwise, and one or more pairs or several radial arms $c'$, the latter serving as guides for the clutching members or clamps, as D D', or for several pairs of such clamps. The outer clutching member or clamp D consists of a sliding shank $d$ and a clamp-head $d'$ at the outer periphery of the clutch rim or ring B', and the inner clutching member or clamp of a sliding shank $d^2$ and a clamping-head $d^3$ at the inner periphery of the said clutch rim or ring. Both clamp-heads $d'$ $d^3$ are recessed for the reception of the exchangeable or removable wearing-blocks $d^4$, which, when pressed against the inner or outer peripheries of the clutch rim or ring B', grip the same with a powerful bite and effect a frictional union with the pulley B. The clutching members or clamps D D' are held firmly to the arm $c'$ by means of a bolt $d^5$, which connects the shanks $d$ $d^2$, but allows the motion necessary for engaging or releasing the clutch rim or ring B' by aid of slots $d^6$ in said shanks, while the arm $c'$ holds the bolt $d^5$ firmly in place. The lower portions of the shanks $d$ $d^2$ are by means of pins $e$, connected to a clamp-lever E, which has its fulcrum on pin $e'$ in a slot $d^7$ of the arm $c'$, thus affording lateral steadiness and radial compensation for inequalities in the wear of the blocks $d^4$.

The clamp-lever E is provided with an arm $e^2$, which bears against an abutment-slide $f$ in the short arm $f^4$ of the toggle-link F, which is pivoted at $f^3$ to the hub $c$. A tension is produced by means of a spring $d^8$, bearing on a shoulder or projection $d^9$ of the clutching member or clamp D' and on the shoulder or projection $d^{10}$ of the clamp-head $d'$ of the clutching member or clamp D, and thereby exerting an upward and downward spring action upon said member or clamp and causing both clamp-heads $d'$ $d^3$ of the clutching members or clamps simultaneously to be moved and held away from the clutch rim or ring B' when the same is to be released. The abutment-slide $f$ is, by means of a set-screw $f'$, moved forward toward the arm $e^2$ in order to adjust the relative positions of the levers E and F in accordance with the wear of the blocks $d^4$. The toggle-link F is, by means of a pin $f^2$, connected with the toggle-link G, which latter is connected by a pin $g$ with the slide H. The slide H moves longitudinally upon the shaft A, and is caused to revolve with it by means of a key $a$, which fits it loosely. An annular groove $h$ of the slide H permits said slide to be moved longitudinally on the shaft A by means of an ordinary forked shipper. (Not shown.) Each arm $c'$ of the clutch-frame is equipped, whatever may be the number of radial arms employed, in the manner described, with clutching members or clamps D D', clamp-lever E, and toggle-links F G, the latter G being pivoted to the slide H, and by having two or more pairs of clamps D D' at equal distances apart unequal lateral strain on the mechanism and undue friction are avoided. The tension of the spring $d^8$ insures the simultaneous movement of clutching members, or the clamps away from the clutch rim or ring B' when the pulley is released, and thus is avoided the inconvenience often encountered under other constructions in which the release of the clamps partly depends upon the uncertain action of centrifugal force. The abutment-slide $f$ and set-screw $f'$ in Hill's patent are placed on the arm $e^2$ of the lever E, or, in other words, between the clutch mechanism and the pulley B. This arrangement has proved an annoyance and inconvenience in making the adjustment by set-screw $f'$ to compensate for wear of the clutching-clamps, inasmuch as the wrench used for such adjustment must be inserted between the arms of the pulley and there operated very cautiously, which mode of adjustment often results in injury to the hand or fingers of the operator, owing to the very limited space afforded for such manipulation, and hence it is found necessary in small constructions to remove the pulley B in order to make the desired adjustment.

By placing the abutment-slide $f$ and set-screw $f'$ on the toggle-link F, as shown and described, the set-screw is located outside the mechanism, and thus the difficulties and inconveniences mentioned avoided.

I have represented one pair of radial arms $c'$ and clamp-operating levers E, with connections, as described, for operating the clutching members or clamps of said pair of arms; but it is contemplated to use a clutch-frame having any suitable number of radial arms with clutch members or clamps D D', as shown, and to provide a clamp-operating lever and connections for operating each pair of clutch members or clamps accordingly, as the size of the pulley requires.

I do not claim under this patent the construction of the hub portion of the pulley, as I have claimed the same in another application filed November 28, 1888, Serial No. 292,105.

What I claim is—

1. In combination with a friction-clutch pulley, the pivoted operating-lever E, clutching-clamps D D', clutch-frame C, having arm $c'$, and spring $d^8$ between clutching-clamps D D', bearing against and acting upon both of said clamps with a thrusting force simultaneously, substantially as and for the purpose described.

2. In combination with a friction-clutch pulley, the clamps D D', one of which has a lower support for a spring and the other a bearing for said spring, the pivoted operating-lever E, having arm $e^2$, toggle-link F, and set-screw $f'$ on link F, and accessible for adjusting purposes outside the lever E and pulley B, substantially as and for the purpose described.

3. The combination of the pulley B, having a friction-clutch rim B', clamps D D', pivoted lever E, having arm $e^2$ and connected to both of said clamps, the set-screw $f'$, and toggle-link F, the said link having the set-screw attached to it, and the said screw exerting its force against the outer side of the lever E for the purpose of adjusting the movement of the said lever and clamps, substantially as described.

4. In combination with a pulley or wheel B, having a friction-rim B', clutch-arm $c'$, a hub $c$, fixed on the shaft, a sliding sleeve H, two inversely and radially movable clutch members D D', of the type specified, clamp-lever E, pivoted to said clutch members, and toggle-links F G, the inner one of the links thereof provided with means by which its inner end can be adjusted inwardly or outwardly from a position outside the pulley and clutch-arm, substantially as described.

5. The combination, with the loose pulley B, having the friction-rim B', the hub $c$, having arms $c'$, the movable jaws $d$ $d'$, having wearing-blocks $d^4$, the spring $d^8$, lever F, lever E, the loose sleeve H, and the link G, connecting the latter to the lever F, substantially as described.

6. The combination of the pulley having the friction-rim B', the movable jaws D D', spring $d^8$, lever E, hub $c$, having arm $c'$, lever F, loose sliding sleeve H, and the toggle-link G, connecting said sleeve to the lever F, substantially as described.

7. The combination of the pulley B, having the friction-rim B', the hub $c$, having the radial arms $c'$, the movable friction-jaws, movable jaws D D', guided on said arms and adapted to engage the inner and outer sides of the rim, the springs $d^8$, to normally move said jaws in opposite direction from the rim, and the clamp-levers E, pivotally connected to the said jaws, and thereby adapted to move the jaws toward each other and apply them with equal force to the inner and outer sides of the rim, substantially as described.

8. The combination, with a pulley B, having a friction-rim B', two inversely and radially movable clutching-clamps D D', and a radial arm $c'$, of a clutch-frame C, upon which the shanks $d\ d^2$ of the clamp-heads $d'\ d^3$ of said clutching-clamps are mounted, the outer one of said clutching-clamps being provided with a shoulder $d^{10}$ and the inner one thereof with a shoulder $d^9$, which is in substantially the same plane with the shoulder of the outer clamp, but nearer to the shaft, and the spring $d^8$, arranged to thrust against said shoulder, substantially as described.

9. In combination with a friction-clutch pulley, the operating-lever, clutching-clamps, the clutch-frame having an arm, and a spring between the clutch-clamps bearing against and acting upon both of said clamps with a thrusting force simultaneously, substantially as described.

In testimony whereof I hereunto affix my signature in presence of two witnesses.

NOAH SHAW.

Witnesses:
D. M. DULANY, Jr.,
C. A. CHAMBERLIN.